(12) United States Patent  (10) Patent No.: US 11,188,610 B2
Childress  (45) Date of Patent: Nov. 30, 2021

(54) USER NAVIGATION BASED ON CLIENT-SIDE HISTORY

(71) Applicant: Capital One Services, LLC, McLean, VA (US)

(72) Inventor: Brian Childress, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 23 days.

(21) Appl. No.: 16/672,113

(22) Filed: Nov. 1, 2019

(65) Prior Publication Data

US 2021/0133273 A1    May 6, 2021

(51) Int. Cl.
| | |
|---|---|
| *G06F 16/957* | (2019.01) |
| *G06F 9/54* | (2006.01) |
| *G06F 16/2457* | (2019.01) |
| *G06F 16/955* | (2019.01) |
| *G06F 16/954* | (2019.01) |

(52) U.S. Cl.
CPC ......... *G06F 16/9574* (2019.01); *G06F 9/547* (2013.01); *G06F 16/24578* (2019.01); *G06F 16/954* (2019.01); *G06F 16/955* (2019.01)

(58) Field of Classification Search
CPC .............. G06F 16/9574; G06F 16/955; G06F 16/24578; G06F 16/954; G06F 9/547
See application file for complete search history.

(56) References Cited

U.S. PATENT DOCUMENTS

| | | | |
|---|---|---|---|
| 6,310,630 B1 * | 10/2001 | Kulkarni | G06F 16/955 715/776 |
| 9,582,549 B2 | 2/2017 | LeBeau et al. | |
| 9,892,190 B1 | 2/2018 | Kirazci et al. | |
| 10,152,756 B2 | 12/2018 | Isaacson et al. | |
| 10,261,669 B2 | 4/2019 | Kekki et al. | |
| 10,332,009 B2 | 6/2019 | Jain et al. | |
| 2002/0052890 A1 * | 5/2002 | Ingram | G06F 3/04812 715/206 |
| 2015/0199312 A1 * | 7/2015 | Li | G06F 16/958 715/234 |
| 2015/0324434 A1 * | 11/2015 | Greenwood | G06F 16/9566 707/722 |

* cited by examiner

*Primary Examiner* — Truong V Vo
(74) *Attorney, Agent, or Firm* — Sterne, Kessler, Goldstein & Fox P.L.L.C.

(57) ABSTRACT

A method is disclosed. The method includes tracking a plurality of pages visited during a browsing session, and receiving a first input to access a previously visited page of the plurality of pages visited during the browsing session. The method further includes identifying a most recently visited anchor page based on the plurality of pages visited in chronological order, and presenting the most recently visited anchor page in response to the first input to access the previously visited page. The method also includes receiving a second input to access another previously visited page during the browsing session, and identifying another page that is second most recently visited anchor page based on the plurality of pages visited in the chronological order. The method also includes presenting the second most recently visited anchor page in response to the second input to access the other previously visited page.

17 Claims, 5 Drawing Sheets

USER NAVIGATION BASED ON CLIENT-SIDE HISTORY

BACKGROUND

Mobile devices such as smart phones, tablets, laptops, and computers have become the most important part of people's daily life for various daily tasks such as news reading, shopping, and financial activities. Most of the development accordingly is to predict what a mobile device user may be looking for based on few letters or words of a search query, or to recommend to the mobile device user various items based on the mobile device user's browsing history. However, when the mobile device user would like to browse in the backward direction by using, for example, a 'Back' button, or invoking similar functionality to browse in the backward direction, the mobile device user is typically presented with their browsing history in reverse chronological order. Accordingly, it may take the mobile device user more time to reach a desired page in the browsing history.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are a method, a system, and a computer program product embodiments, and/or combinations and sub-combinations thereof, for user navigation based on history on the client side. In particular, this disclosure is related to user navigation in backward direction based on a user's browsing history on a client device.

Much technological development in recent history related to browsing is about resolving what a user would like to see next on their client device. The user may use a mobile phone, a laptop, a tablet, a desktop, or a similar device as a client device to search on the internet. The user would provide a search query and the autocomplete or similar feature would complete the search query based on a few words the user has entered so far. Or, the user's browsing history is used to suggest advertisement, or other content. Looking at this from another angle, most of the technological development is to predict what a user will do next, and offer the content as soon as possible to the user based on the prediction. Accordingly, predicted content may be pre-cached on the client device so that the content is available to the user as soon as possible. Similarly, content viewed by the user may also be pre-cached in the reverse chronological order to present to the user upon activation of 'Back' button to navigate in the backward direction.

For example, a user searching the internet for a new laptop may be presented with several options for purchasing a laptop based on initial search criteria. Web pages rendered to the user may also have other suggested items' web pages that may be populated based on various criteria. If the user, for example, after visiting many web pages of the suggested items, would like to navigate in a backward direction, the user may be presented web pages from the browsing history in reverse chronological order when a 'Back' button or other function providing functionality similar to a 'Back' button is activated. The 'Back' button may be on the client device that may allow the user to navigate in the reverse direction. The other function providing functionality similar to the 'Back' button may be an option/icon provided on the web browser or mobile application that may allow the user to navigate in the reverse direction. Accordingly, any mechanism that may allow the user to navigate in the reverse direction is activated, the user may be presented web pages from the browsing history in reverse chronological order. Now, if the user has accessed ten different pages from the original search results page, then it may take the user to activate the 'Back' button at least ten times—a needlessly time-consuming exercise—to go back to the search page.

Accordingly, an objective of the present application is to provide user navigation in a backward direction that may allow the user to reach a main page or an anchor page without going through each page in the reverse chronological order. A page, or a web page as referenced in this disclosure, may be identified as an anchor page by the mobile application/web application designer(s). By way of non-limiting example, the page may be identified as the anchor page if the page is a main page and/or a most visited page. The page may provide web links to other pages of the mobile application or the web site. The web page may be identified as the anchor page if it is a home page or a landing page of the mobile application or the web site. The page's metadata may identify the page as an anchor page. While navigating in the reverse direction upon activation of 'Back' button, pages in the browsing history that are not marked as anchor pages may be skipped, and only pages marked as anchor pages may be presented to the user. Thus, the user may arrive at an anchor page in a single 'Back' button activation while navigating in the reverse direction.

Metadata of a page may be updated to specify the page as an anchor page. In addition, the metadata of the anchor page may also include a priority ranking. The priority ranking of the page therefore may be configurable. When the user activates the 'Back' button, or other navigation mechanism, on the anchor page, metadata of the previously visited pages in the browsing history in the reverse chronological order may be accessed to identify if the page is an anchor page. If the previously visited page in the browsing history in the reverse chronological order is an anchor page, its priority ranking may be compared with the priority ranking of the current anchor page at which the 'Back' button is activated. If the priority ranking of the previously visited anchor page is lower than the priority ranking of the current anchor page, the previously visited anchor page with lower priority ranking than the priority ranking of the current anchor page may be skipped. If the priority ranking of the previously visited anchor page is same as the priority ranking of the current anchor page, the previously visited anchor page with the same priority ranking as the priority ranking of the current anchor page may be skipped if the previously visited page and the current page are same. But if the previously visited anchor page having same priority ranking as the priority ranking of the current anchor page and the previously visited anchor page is different from the current anchor page, the previously visited anchor page may be presented to user during reverse navigation. Similarly, if the priority ranking of the previously visited anchor page is higher than the priority ranking of the current anchor page, the previously visited anchor page may be presented to user during reverse navigation.

By way of non-limiting example, the application may be a rich web application, a mobile application, or a mobile website. When a user visits a particular web site using a web browser or a rich web application, the web site may be loaded in the web browser on the client device. Each web page accessed from the web site thus gets stored on the client device as part of the browsing history. The rich web application or the web browser may use an application programming interface (API) to generate a browsing history of web pages visited during the browsing session. By way of non-limiting example, if the web browser or the rich web application uses HTML5, pushstates( )) method of API may be used to build the browsing history. Similarly, when the user launches the mobile application, web pages visited on the mobile application during a browsing session may be tracked and stored on the client device as part of the browsing history. The browsing history thus may contain references to the visited web pages. The references may be uniform resource locators (URLs) and/or web page identifications (IDs).

By way of non-limiting example, a user may have visited three pages, Page A, Page B, and Page C, in order, using the mobile application or the web browser. To navigate in reverse direction to return to a previously visited page, e.g., Page B when viewing Page C, the user may activate the 'Back' button. The mobile application or the web browser may load Page B. If the user activates the 'Back' button one more time when viewing Page B, the mobile application or the web browser may load Page A. Thus, it takes the user to activate the 'Back' button twice to navigate in reverse direction from Page C to Page A.

Instead, as described herein, if Page A has been marked or identified as an anchor page, and Page B and Page C are not anchor pages, when the user activates the 'Back' button when viewing Page C, the web pages visited in the reverse chronological order and not identified/marked as the anchor pages may be skipped. The first web page marked or identified as the anchor page and visited in the reverse chronological order may be displayed to the user when the 'Back' button is activated by the user. Thus, using a 'Back' button once, the user may be navigated to Page A from Page C because Page A is an anchor page.

Various embodiments of these features will now be discussed with respect to the corresponding figures.

Figure 1:
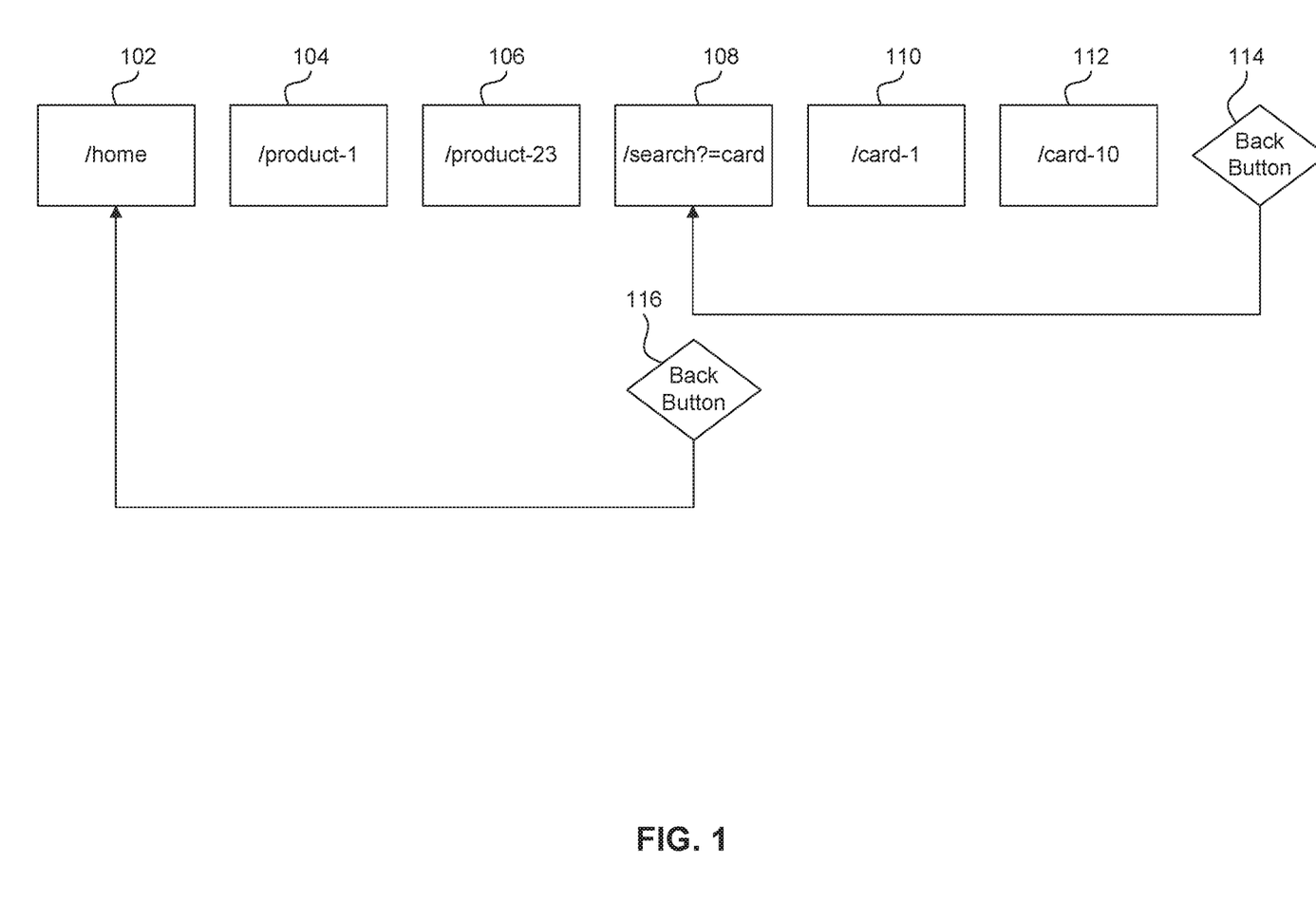
FIG. 1 illustrates a browsing history on the client device, in accordance with some embodiments.

FIG. 1 illustrates a browsing history on the client device, in accordance with some embodiments. As shown in FIG. 1, once the user has launched the mobile application on their client device, a home page 102 of the mobile application may display to the user. During the browsing session of the mobile application, the user may have visited, by way of non-limiting example, a first web page 104 corresponding to a first product displayed on the home page, and a second web page 106 corresponding the a twenty-third product displayed on the first web page, a search page 108 based on a web link on the second web page 106, a first search item web page 110 corresponding to a first card, and a second search item web page 112 corresponding to a tenth card, in the order as described.

As described above, a web page may be identified or marked as an anchor page and corresponding priority ranking may also be assigned to the anchor page. By way of non-limiting example, the home page 102 and the search page 108 may be identified/marked as the anchor pages. Accordingly, metadata of the home page 102 and the search page 108 may include priority rankings assigned to the home page 102 and the search page 108. By way of non-limiting example, the home page 102 and the search page 108 may be assigned the same priority ranking. In some embodiments, the home page 102 is a landing page of the mobile application. The landing page is the first page of the mobile application when the mobile application is launched. The landing page may be an anchor page.

When the user activates the 'Back' button when viewing the second search item web page 112, a most recently visited anchor page may be identified upon activation of the 'Back' button. Corresponding to the browsing history as shown in FIG. 1, it may be determined that the most recently visited anchor page or the most recently visited anchor page in the reverse chronological order is the search page 108. By way of non-limiting example, the most recently visited anchor page may be identified based on the timestamps corresponding to the visited web pages stored in the browsing history. Accordingly, the search page 108 may be presented to the user in response to the activation of the 'Back' button to access the previously visited page during the browsing session when viewing the second search item web page 112. Since the search page 108 is identified as the anchor page, instead of the first search item web page 110 the most recently visited anchor page, the search page 108, may be presented.

The user may activate the 'Back' button when viewing the search page 108 as shown in FIG. 1 as 116. By way of non-limiting example, because the search page 108 is presented to the user as a result of invoking the functionality associated with the navigation in the reverse direction, the most recently visited anchor page would again be the search page 108. Since the most recently visited anchor page 108 has the same priority ranking as the current anchor page, and the most recently visited anchor page 108 is the same page as the current anchor page, the page 108 may be skipped. The next most recently visited anchor page is the home page 102, and the home page 102 may be presented to the user upon activation of the 'Back' button at the search page 108 as shown at 116.

By way of non-limiting example, if the home page 102 is not marked or identified as an anchor page, when the user activates the 'Back' button at the page 108, there are no web pages that are anchor pages based on the browsing history. In such case, the user may be presented the page 102 instead of the page 106 and/or page 104. Accordingly, the landing page of the mobile application may be a special page and may be treated as an anchor page.

Figure 2A:
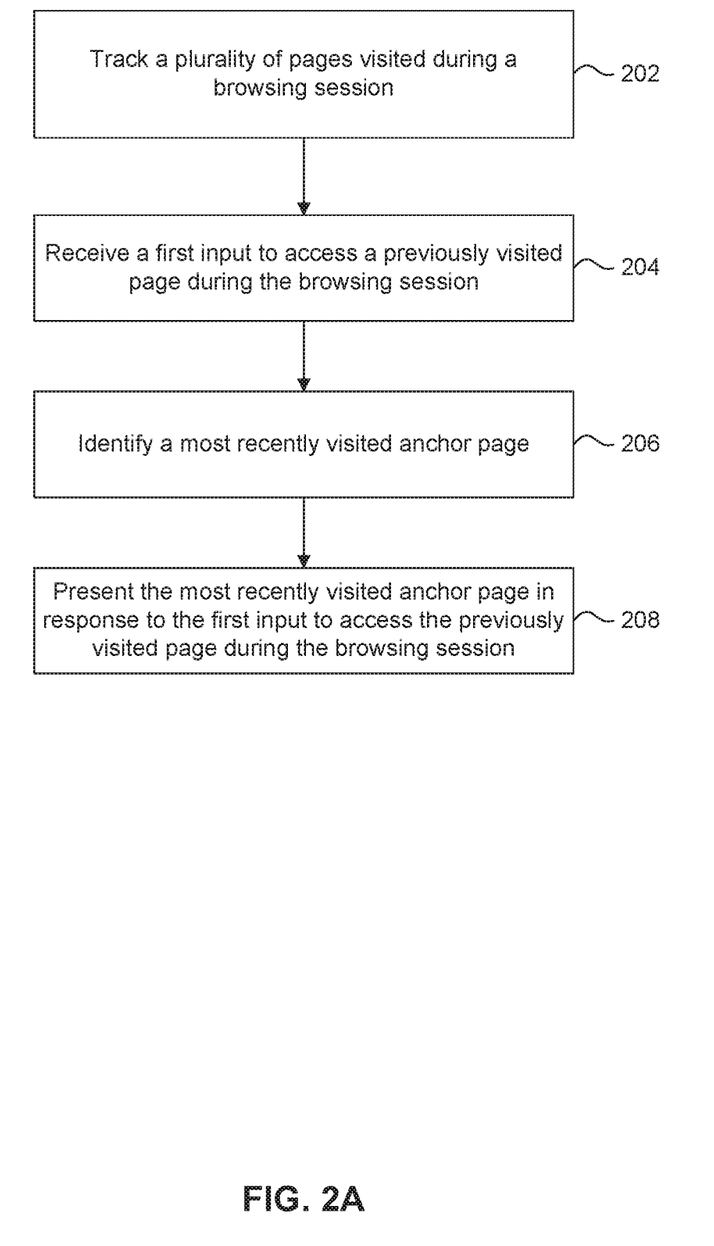
FIG. 2A illustrates an exemplary flow chart of a method to provide user navigation based on history on a client device, in accordance with some embodiments.

FIG. 2A illustrates an exemplary flow chart of a method to provide user navigation based on history on a client device, in accordance with some embodiments. At step 202, a plurality of web pages visited during a browsing session may be tracked. The web pages visited during the browsing session may be stored in the browsing history as references to the visited web pages. The references to the visited web pages may be URLs or web page IDs. At step 204, a first input to access a previously visited web page during the browsing session may be received as the user activate the 'Back' button. By way of non-limiting example, when viewing the page 112, the first input to access the previously visited web page may be received when the user activates the 'Back' button at 114. At step 206, a most recently visited anchor page may be identified. Metadata of each web page may indicate whether the web page is an anchor page, and if the web page is an anchor page, the metadata may further include priority ranking of the web page. Accordingly, upon activation of the 'Back' button 114, based on the browsing history, the most recently visited anchor page may be identified based on the metadata of the visited web pages. At step 208, the most recently visited anchor page may be presented to the user in response to the first input to access the previously visited web page during the browsing session.

Figure 2B:
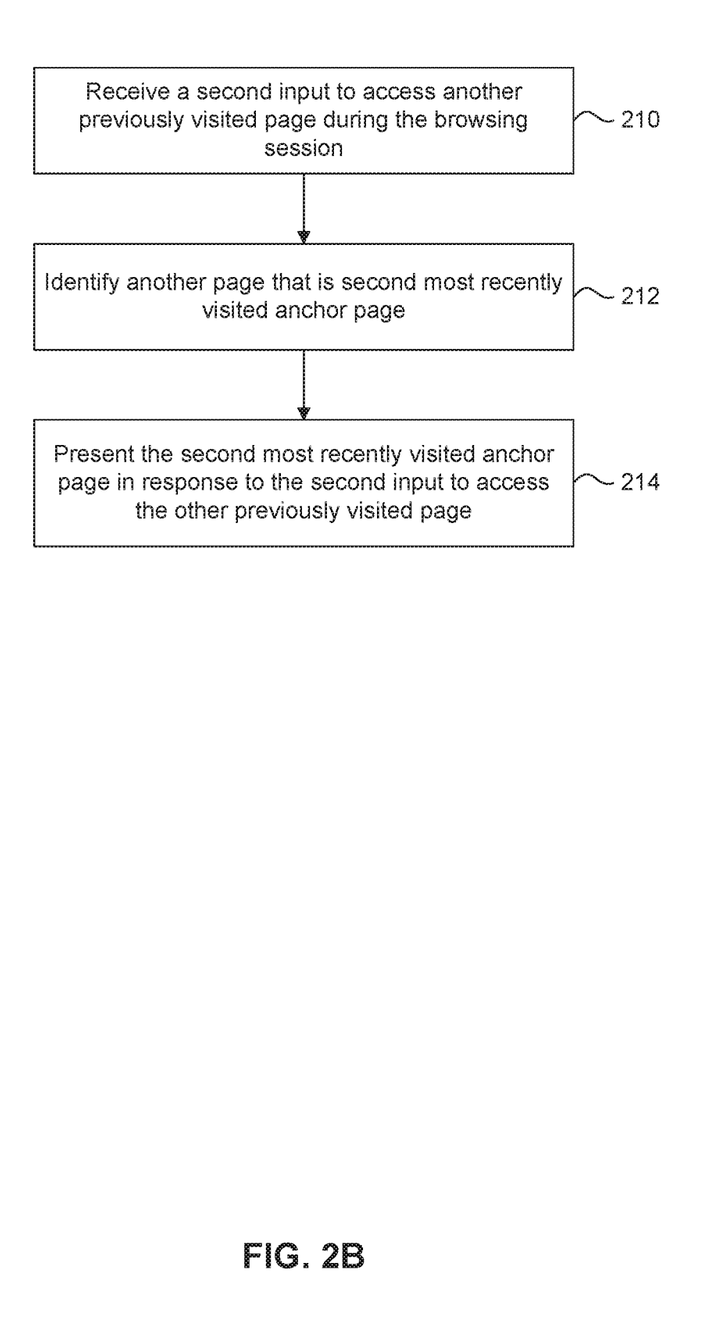
FIG. 2B illustrates an exemplary flow chart of a method to provide user navigation based on history on a client device, in accordance with some embodiments.

FIG. 2B illustrates an exemplary flow chart of a method to provide user navigation based on history on a client device, in accordance with some embodiments. At step 210, a second input to access another previously visited page during the browsing session may be received. By way of non-limiting example, when viewing the page 108, the 'Back' button may be activated as shown at 116 to access the other previously visited page during the browsing session. At step 212, another that is second most recently visited anchor page may be identified. Metadata of the previously visited web pages based on the browsing history may be checked to identify the second most recently visited anchor page. Based on the browsing history, the most recently visited anchor page in the reverse chronological order is the search page 108, which is also same as the current anchor page. Therefore, the search page 108 is skipped; the next most recently visited anchor page in the reverse chronological order is the page 102. Therefore, the home page 102 may be identified as the other page that is second most recently visited anchor page, and at step 214, the home page 102 may be presented to the user in response to the second input to access the other previously visited web page.

Figure 3:
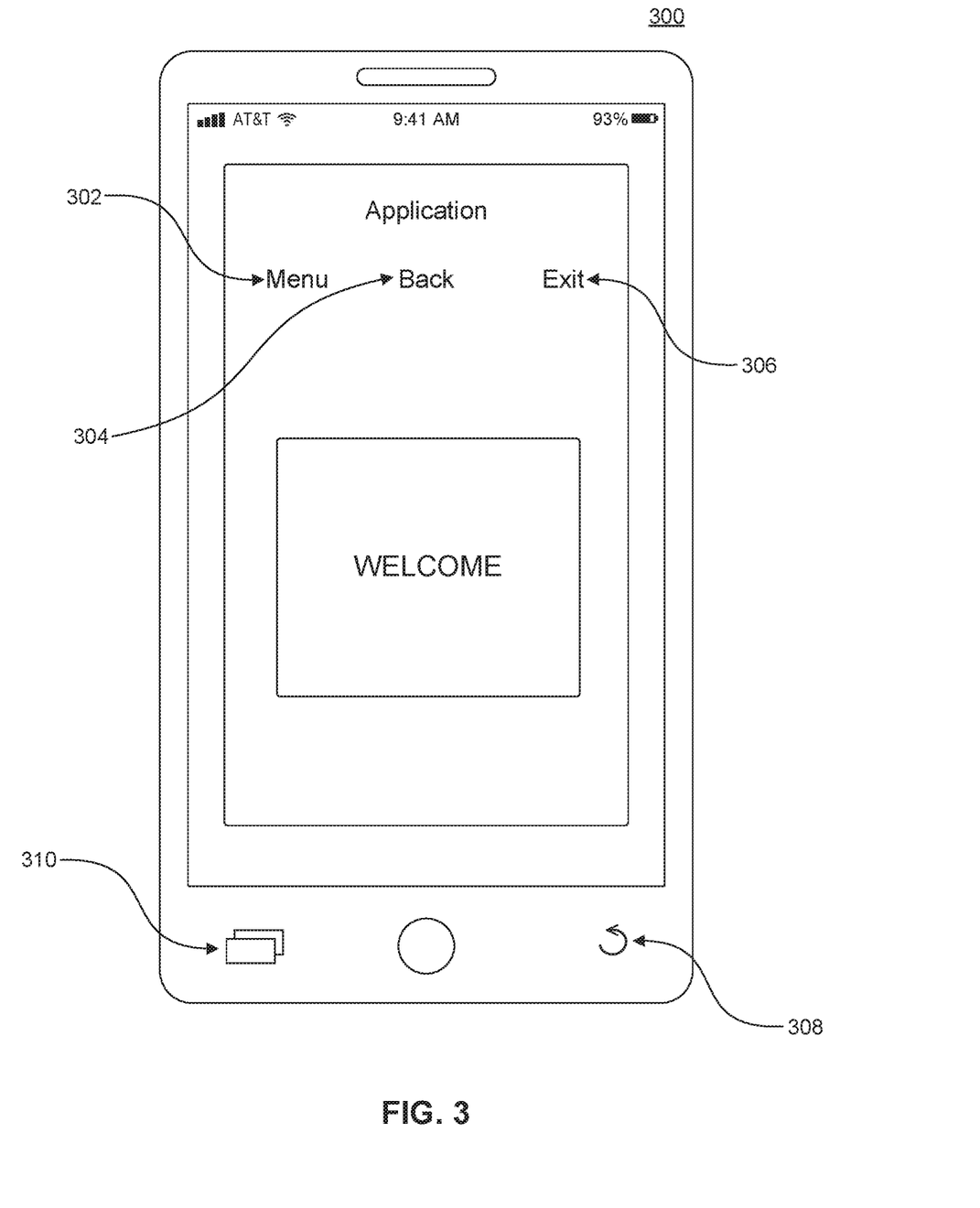
FIG. 3 illustrates an exemplary user interface, in accordance with some embodiments.

FIG. 3 illustrates an exemplary user interface, in accordance with some embodiments. As shown in FIG. 3, a mobile phone 300 is shown when the mobile application downloaded to the mobile phone 300 is launched. A home page of the mobile application, also known as a landing page of the mobile application, is shown. User can browse other web pages of the mobile application by accessing a menu option 302 and exit the mobile application by an Exit option 306. The mobile phone 300 may also allow the user to browse other applications using a button 310. A 'Back' button 308 may allow the user to navigate in the reverse direction. Similarly, the mobile application may also allow the user to navigate in the reverse direction when the user selected a 'Back' option 304. Thus, the user may navigate in the reverse direction either using 'Back' option 304 or the 'Back' button 308. If the user is using the rich web application, then also the user may use the 'Back' button 308 or other 'Back' option (not shown) on the rich web application browser.

Figure 4:
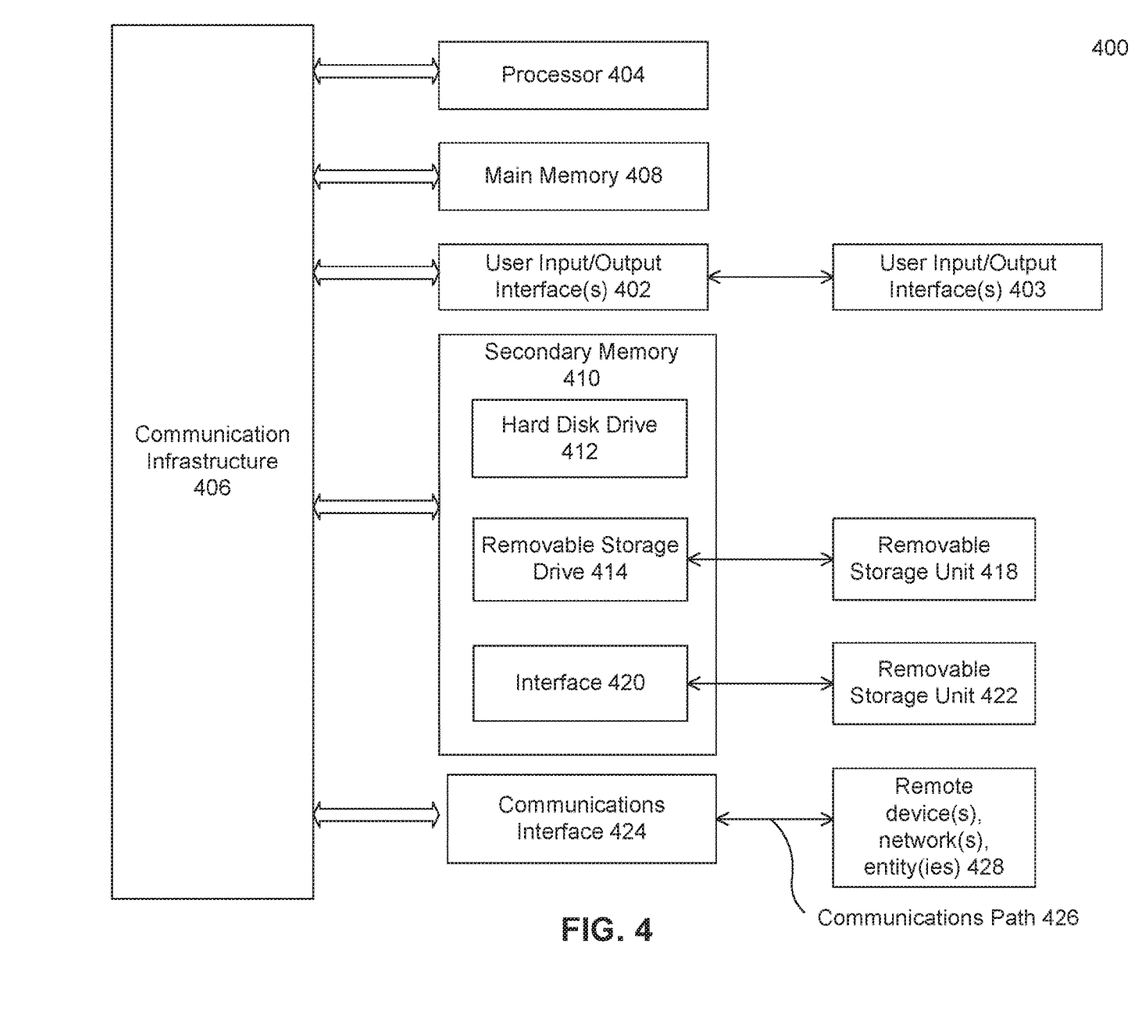
FIG. 4 illustrates an exemplary computer system, in accordance with some embodiments.

FIG. 4 illustrates an example of a computer system, in accordance with some embodiments.

Various embodiments may be implemented, for example, using one or more well-known computer systems, such as a computer system 400 as shown in FIG. 4. One or more computer systems 400 may be used, for example, to implement any of the embodiments discussed herein, as well as combinations and sub-combinations thereof.

The computer system 400 may include one or more processors (also called central processing units, or CPUs), such as a processor 404. The processor 404 may be connected to a communication infrastructure or bus 406.

The computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

The computer system 400 may also include a main or primary memory 408, such as random access memory (RAM). Main memory 408 may include one or more levels of cache. Main memory 408 may have stored therein control logic (i.e., computer software) and/or data.

The computer system 400 may also include one or more secondary storage devices or memory 410. The secondary memory 410 may include, for example, a hard disk drive 412 and/or a removable storage device or drive 414. The removable storage drive 414 may be a floppy disk drive, a magnetic tape drive, a compact disk drive, an optical storage device, tape backup device, and/or any other storage device/drive.

The removable storage drive 414 may interact with a removable storage unit 418. The removable storage unit 418 may include a computer usable or readable storage device having stored thereon computer software (control logic) and/or data. The removable storage unit 418 may be a floppy disk, magnetic tape, compact disk, DVD, optical storage disk, and/any other computer data storage device. The removable storage drive 414 may read from and/or write to removable storage unit 418.

The secondary memory 410 may include other means, devices, components, instrumentalities or other approaches for allowing computer programs and/or other instructions and/or data to be accessed by the computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

The computer system 400 may further include a communication or network interface 424. The communication interface 424 may enable the computer system 400 to communicate and interact with any combination of external devices, external networks, external entities, etc. (individually and collectively referenced by reference number 428). For example, the communication interface 424 may allow the computer system 400 to communicate with the external or remote devices 428 over communications path 426, which may be wired and/or wireless (or a combination thereof), and which may include any combination of LANs, WANs, the Internet, etc. Control logic and/or data may be transmitted to and from the computer system 400 via the communication path 426.

The computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

The computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in the computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, the computer system 400, the main memory 408, the secondary memory 410, and the removable storage units 418 and 422, as well as tangible articles of manufacture embodying any combination of the foregoing. Such control logic, when executed by one or more data processing devices (such as the computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A method, comprising:
   tracking, by one or more computing devices, a plurality of pages visited during a browsing session;
   receiving, by the one or more computing devices, a first input to access a previously visited page of the plurality of pages visited during the browsing session;
   in response to the received first input, identifying, by the one or more computing devices, an anchor page that is most recently visited anchor page among the plurality of pages visited in chronological order, wherein the anchor page corresponds to one of a plurality of frequently visited pages of an application;
   navigating, by the one or more computing devices, from a current page to the anchor page that is most recently visited, while skipping one or more non-anchor pages visited between the most recently visited anchor page and the current page;
   receiving, by the one or more computing devices, a second input to access another previously visited page during the browsing session;
   in response to the received second input, identifying, by the one or more computing devices, another anchor page that is second most recently visited anchor page based on the plurality of pages visited in the chronological order; and
   navigating, by the one or more computing devices, from the anchor page that is most recently visited anchor page to the other anchor page that is second most recently visited anchor page.

2. The method of claim 1, wherein the application comprises a web application, a mobile application, or a rich web application, and wherein the tracking the plurality of pages visited during the browsing session comprises:
   executing, by the one or more computing devices, an application programming interface (API) method to generate a history of web pages visited during the browsing session.

3. The method of claim 1, wherein the application comprises a web application, a mobile application, or a rich web application, and wherein the tracking the plurality of pages visited during the browsing session comprises:
   storing, by the one or more computing devices, the plurality of pages visited during the browsing session in an application memory of one of the mobile application, the web application, and the rich web application.

4. The method of claim 1, wherein at least one page of the plurality of pages has a priority ranking that is higher in comparison with priority ranking of other pages of the plurality of pages, and wherein the priority ranking is configurable.

5. The method of claim 1, further comprising:
   determining, by the one or more computing devices, the plurality of pages visited during the browsing session do not comprise any anchor page; and
   in response to the first input, navigating, by the one or more computing devices, from the current page to a first page that is displayed upon launch of the application.

6. The method of claim 1, further comprising:
   comparing, by the one or more computing devices, a priority ranking of the anchor page that is most recently visited anchor page with a priority ranking of the other anchor page that is second most recently visited anchor page; and
   in response to the comparison indicating the priority ranking of the anchor page that is most recently visited anchor page and the priority ranking of the other anchor page that is second most recently visited anchor page being same, navigating, by the one or more computing devices, from the current page to a first page displayed upon launch of the application.

7. A user equipment (UE) device, comprising:
   a memory for storing operations; and
   one or more processors, communicatively coupled to the memory, configured to perform the operations comprising:
      tracking a plurality of pages visited during a browsing session;
      receiving a first input to access a previously visited page of the plurality of pages visited during the browsing session;
      in response to the received first input, identifying an anchor page that is most recently visited anchor page among the plurality of pages visited in chronological order, wherein the anchor page corresponds to one of a plurality of frequently visited pages of an application;
      navigating from a current page to the anchor page that is most recently visited, while skipping one or more non-anchor pages visited between the most recently visited anchor page and the current page;
      receiving a second input to access another previously visited page during the browsing session;
      in response to the received second input, identifying another anchor page that is second most recently visited anchor page based on the plurality of pages visited in the chronological order; and
      navigating from the anchor page that is most recently visited anchor page to the other anchor page that is second most recently visited anchor page.

8. The UE device of claim 7, wherein the application comprises a web application, a mobile application, or a rich web application, and wherein for the tracking the plurality of pages visited during the browsing session, the operations further comprise:
   executing an application programming interface (API) method to generate a history of web pages visited during the browsing session.

9. The UE device of claim 7, wherein the application comprises a web application, a mobile application, or a rich web application, and wherein for the tracking the plurality of pages visited during the browsing session, the operations further comprise:
   storing the plurality of pages visited during the browsing session in an application memory of one of the mobile application, the web application, and the rich web application.

10. The UE device of claim 7, wherein at least one page of the plurality of pages has a priority ranking that is higher in comparison with priority ranking of other pages of the plurality of pages, and wherein the priority ranking is configurable.

11. The UE device of claim 7, wherein operations further comprise:
   determining the plurality of pages visited during the browsing session do not comprise any anchor page; and
   in response to the first input, navigating from the current page to a first page that is displayed upon launch of the application.

12. The UE device of claim 7, wherein operations further comprise:
   comparing a priority ranking of the anchor page that is most recently visited anchor page with a priority ranking of the other anchor page that is second most recently visited anchor page; and
   in response to the comparison indicating the priority ranking of the anchor page that is most recently visited anchor page and the priority ranking of the other anchor page that is second most recently visited anchor page being same, navigating from the current page to a first page displayed upon launch of the application.

13. A non-transitory, tangible computer-readable device having instructions stored thereon that, when executed by at least one computing device, causes the at least one computing device to perform operations comprising:
   tracking a plurality of pages visited during a browsing session;
   receiving a first input to access a previously visited page of the plurality of pages visited during the browsing session;
   in response to the received first input, identifying an anchor page that is most recently visited anchor page among the plurality of pages visited in chronological order, wherein the anchor page corresponds to one of a plurality of frequently visited pages of an application;
   navigating from a current page to the anchor page that is most recently visited, while skipping one or more non-anchor pages visited between the most recently visited anchor page and the current page;
   receiving a second input to access another previously visited page during the browsing session;
   in response to the received second input, identifying another anchor page that is second most recently visited anchor page based on the plurality of pages visited in the chronological order; and
   navigating from the anchor page that is most recently visited anchor page to the other anchor page that is second most recently visited anchor page.

14. The non-transitory, tangible computer-readable device of claim 13, wherein the application comprises a web application, a mobile application, or a rich web application, and wherein for the tracking the plurality of pages visited during the browsing session, the operations further comprise:
   executing an application programming interface (API) method to generate a history of web pages visited during the browsing session.

15. The non-transitory, tangible computer-readable device of claim 13, wherein the application comprises a web application, a mobile application, or a rich web application, and wherein for the tracking the plurality of pages visited during the browsing session, the operations further comprise:
- storing the plurality of pages visited during the browsing session in an application memory of one of the mobile application, the web application, and the rich web application.

16. The non-transitory, tangible computer-readable device of claim 13, wherein the operations further comprise:
- determining the plurality of pages visited during the browsing session do not comprise any anchor page; and
- in response to the first input, navigating from the current page to a first page that is displayed upon launch of the application,
- wherein at least one page of the plurality of pages has a priority ranking that is higher in comparison with priority ranking of other pages of the plurality of pages, and wherein the priority ranking is configurable.

17. The non-transitory, tangible computer-readable device of claim 13, wherein the operations further comprise:
- comparing a priority ranking of the anchor page that is most recently visited anchor page with a priority ranking of the other anchor page that is second most recently visited anchor page; and
- in response to the comparison indicating the priority ranking of the anchor page that is most recently visited anchor page and the priority ranking of the other anchor page that is second most recently visited anchor page being same, navigating from the current page to a first page displayed upon launch of the application.

* * * * *